(12) United States Patent
Horihata et al.

(10) Patent No.: US 8,265,718 B2
(45) Date of Patent: Sep. 11, 2012

(54) MOBILE WIRELESS DEVICE (75) Inventors: Kenshi Horihata, Kanagawa (JP); Nobuhiro Iwai, Kanagawa (JP); Kenichi Sato, Miyagi (JP)

(73) Assignee: Panasonic Corporation, Osaka (JP)

( * ) Notice: Subject to any disclaimer, the term of this patent is extended or adjusted under 35 U.S.C. 154(b) by 187 days.

(21) Appl. No.: 12/812,421

(22) PCT Filed: Dec. 26, 2008

(86) PCT No.: PCT/JP2008/003997
§ 371 (c)(1),
(2), (4) Date: Jul. 9, 2010

(87) PCT Pub. No.: WO2009/087739
PCT Pub. Date: Jul. 16, 2009

(65) Prior Publication Data
US 2010/0285851 A1 Nov. 11, 2010

(30) Foreign Application Priority Data
Jan. 11, 2008 (JP) .................................. 2008-004756

(51) Int. Cl.
*H04W 88/02* (2009.01)
(52) U.S. Cl. .................. 455/575.3; 455/575.1; 455/90.3
(58) Field of Classification Search ............... 455/575.1, 455/575.3, 90.3, 128, 129, 347, 348, 349
See application file for complete search history.

(56) References Cited

FOREIGN PATENT DOCUMENTS

| JP | 2005236396 A | 9/2005 |
|----|--------------|--------|
| JP | 2005318407 A | 11/2005 |
| JP | 2006129230 A | 5/2006 |
| JP | 2007088692 A | 4/2007 |
| JP | 2007096991 A | 4/2007 |
| JP | 2007142745 A | 6/2007 |
| JP | 2007318236 A | 12/2007 |
| WO | 2007032330 A | 3/2007 |

OTHER PUBLICATIONS

International Search Report relating to International Application No. PCT/JP2008/003997, mailed Apr. 7, 2009, 4 pages.

*Primary Examiner* — Cong Tran
(74) *Attorney, Agent, or Firm* — Seed IP Law Group PLLC (57) ABSTRACT

Disclosed is a mobile wireless device, which has an antenna structure for feeding a hinge core with an electric power and which can be adapted to wireless communications of low-frequency bands without enlarging a casing itself. In this wireless device, an upper casing (101) equipped with a first circuit substrate (111) and a lower casing (102) equipped with a second circuit substrate (112) having a wireless unit (118) mounted thereon are connected to open and close through a hinge unit having a conductive hinge (130). A feeding unit (113) mounted in the upper casing (101) feeds the conductive hinge (130) with an electric power from the first circuit substrate (111). A cellular antenna (150) mounted in the lower casing (102) is connected with the ground pattern of the second circuit substrate (112) at the position, where an extension (154) is separated along the axial direction of the conductive hinge (130) from a capacity coupling unit (152) arranged to confront a portion of the conductive hinge (130) and coupled capacitively to a portion of the conductive hinge (130), thereby to short-circuit the capacity coupling unit (152) and the ground pattern.

10 Claims, 6 Drawing Sheets

MOBILE WIRELESS DEVICE

BACKGROUND ART

The present invention relates to a mobile radio device such as a mobile telephone. More particularly, the present invention relates to a flip mobile radio device in which two housings are coupled through a hinge part to open and close.

TECHNICAL FIELD

Recently, as a mobile radio device that is one type of a mobile radio telephone, flip mobile radio devices that adopt a structure in which an upper housing and a lower housing are coupled through a hinge part to open and close and that show two states of the open state upon speech communication and data communication and the closed state upon stand-by mode, have become widely popular.

Flip mobile radio devices are increasingly made smaller and more multifunctional, and, in recent years, are being made multifunctional by, for example, building antennas in flip mobile radio devices to improve design. As built-in flip mobile radio devices in which antennas are built inside, for example, Patent Document 1 and Patent Document 2 disclose a structure in which power is fed to a hinge part from the power feeding means that is provided inside a lower housing and that is connected to a radio section of a circuit board with a ground pattern, the hinge part is conducted to the frame of an upper housing, the frame is used as an antenna element, and the frame, hinge part and ground pattern are made to operate as a dipole antenna.

With this structure, when the flip mobile radio device is open, the dipole operation is performed by using the frame of the upper housing and the circuit board of the lower housing (to be more specific, the ground pattern) as an antenna element without projections. This antenna performing the dipole operation secures a large antenna volume, that is, secures a wide effective antenna area, without limiting in its height in the housing in which the antenna is disposed, so that it is readily possible to provide antenna performance for a wideband and high gain.

Patent Document 1: Japanese Patent Application Laid-Open No. 2005-236396 Patent Document 2: Japanese Patent Application Laid-Open No. 2007-142745

DISCLOSURE OF INVENTION

Problems to be Solved by the Invention

However, with the antenna structure of the conventional flip mobile radio device that performs the dipole operation by feeding power to the hinge part, the electrical length which serves as the length of the antenna element (also "circuit board length" which is the length of the diagonal line of the circuit board) requires a length of λ/4 wavelength in the frequency band to cause resonance. For example, the circuit board length in flip mobile radio devices in recent years is generally about 95 millimeters and the resonance frequency is about 800 MHz, and therefore the dimensions of the housing itself (i.e. housing length) are set accordingly.

Hence, in case where the antenna of the conventional mobile radio device is structured to support a random frequency band, while the housing length in the conventional mobile radio device can cause resonance in a frequency band equal to or greater than a predetermined frequency band by making the size of the circuit board matching the housing length smaller and thereby making the circuit board length shorter, it is difficult to cause resonance in a frequency band lower than the predetermined frequency band by making the circuit board length longer.

That is, with the conventional flip mobile device of recent years, in case where resonance is caused in a frequency band (for example, a frequency band around 500 MHz of the digital television band) lower than a predetermined frequency band (for example, cellular band), the above structure cannot make the circuit board length longer due to the limitation to the dimensions of the housing and therefore cannot cause resonance in a low frequency band because the element length of an antenna is insufficient. To support, for example, about 500 MHz of the digital television band, antennas need a length of 150 millimeters and the conventional housing length cannot secure that antenna element length.

By contrast with this, although it is possible to extend a metal elongated element from an end part of the circuit board forming the circuit board length and make the dimensions of the circuit board larger in order to make the circuit board length longer in the conventional flip mobile radio device, the housing itself needs to be made larger accordingly, and, in any case, this raises a problem of making it difficult to miniaturize the conventional flip mobile radio device.

It is therefore an object of the present invention to provide a mobile radio device that has an antenna structure for feeding power to a hinge part and that supports wireless communication in a lower frequency band without making a housing itself larger.

Means for Solving the Problem

The mobile radio device according to the present invention in which a first housing and a second housing are coupled rotatably by a hinge part to open and close, employs a configuration which includes: a first circuit board which is provided inside the first housing; a second circuit board which is provided inside the second housing and on which a radio circuit is mounted; a conductive hinge which is provided in the hinge part; a power feeding section which is provided inside the first housing and which feeds power to the conductive hinge from the first circuit board; and a capacitive coupling element which is provided inside the second housing, and which comprises an elongated part that is capacitive-coupled to part of the conductive hinge, through a capacitive coupling part arranged to face the part of the conductive hinge, that is connected to a ground pattern of the second circuit board, in a position apart from the capacitive coupling part along an axial direction of the conductive hinge and that short-circuits the capacitive coupling part and the ground pattern.

Advantageous Effects of Invention

The present invention adopts an antenna structure for feeding power to a hinge part and supports wireless communication in a low frequency band without making the housing itself larger.

BEST MODE FOR CARRYING OUT THE INVENTION

Hereinafter, embodiments of the present invention will be explained in detail with reference to the accompanying drawings.

Embodiment 1

Figure 1:
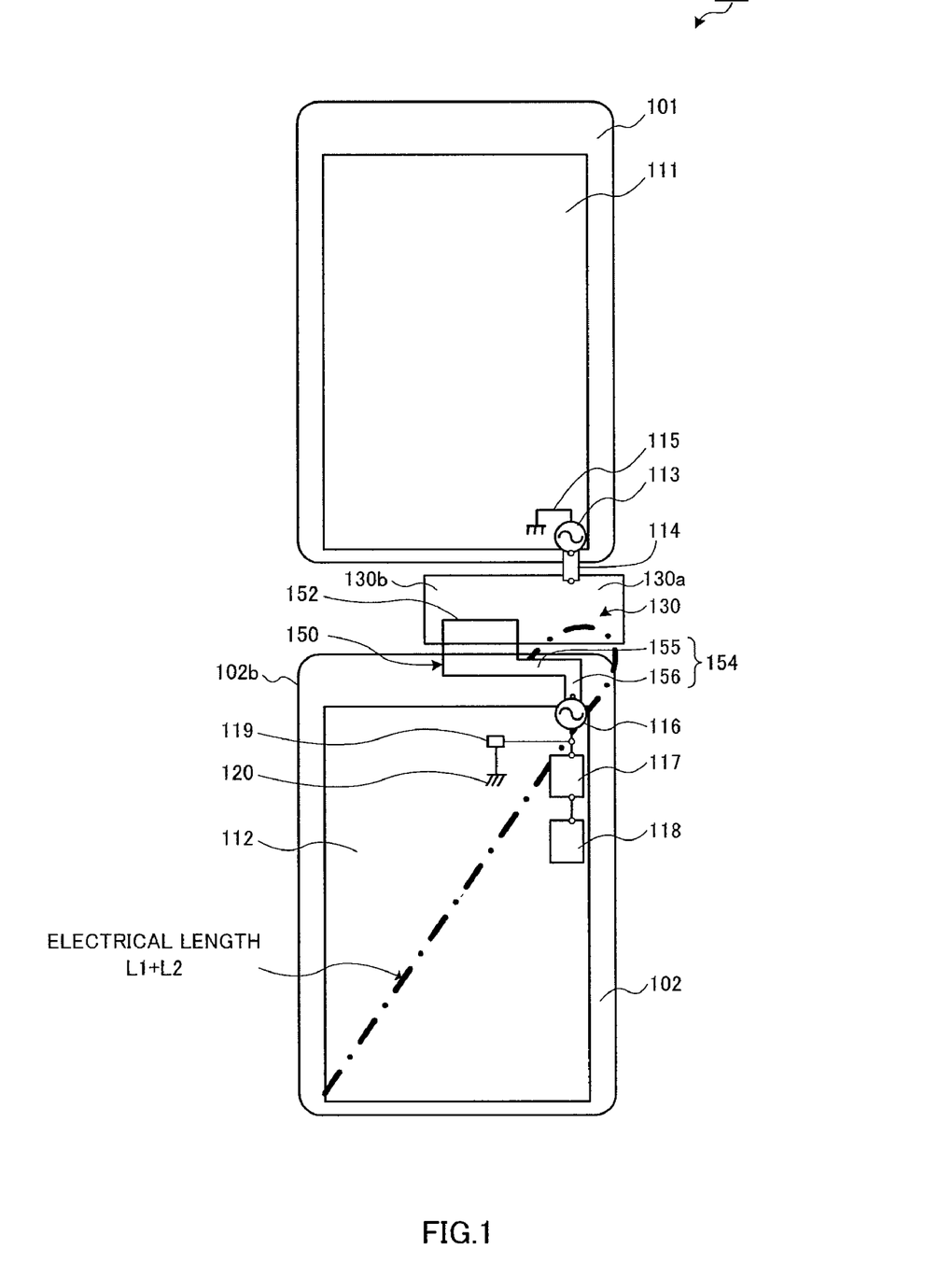
FIG. 1 is a plan view showing a schematic configuration of a mobile radio device according to Embodiment 1 of the present invention.
Figure 2:
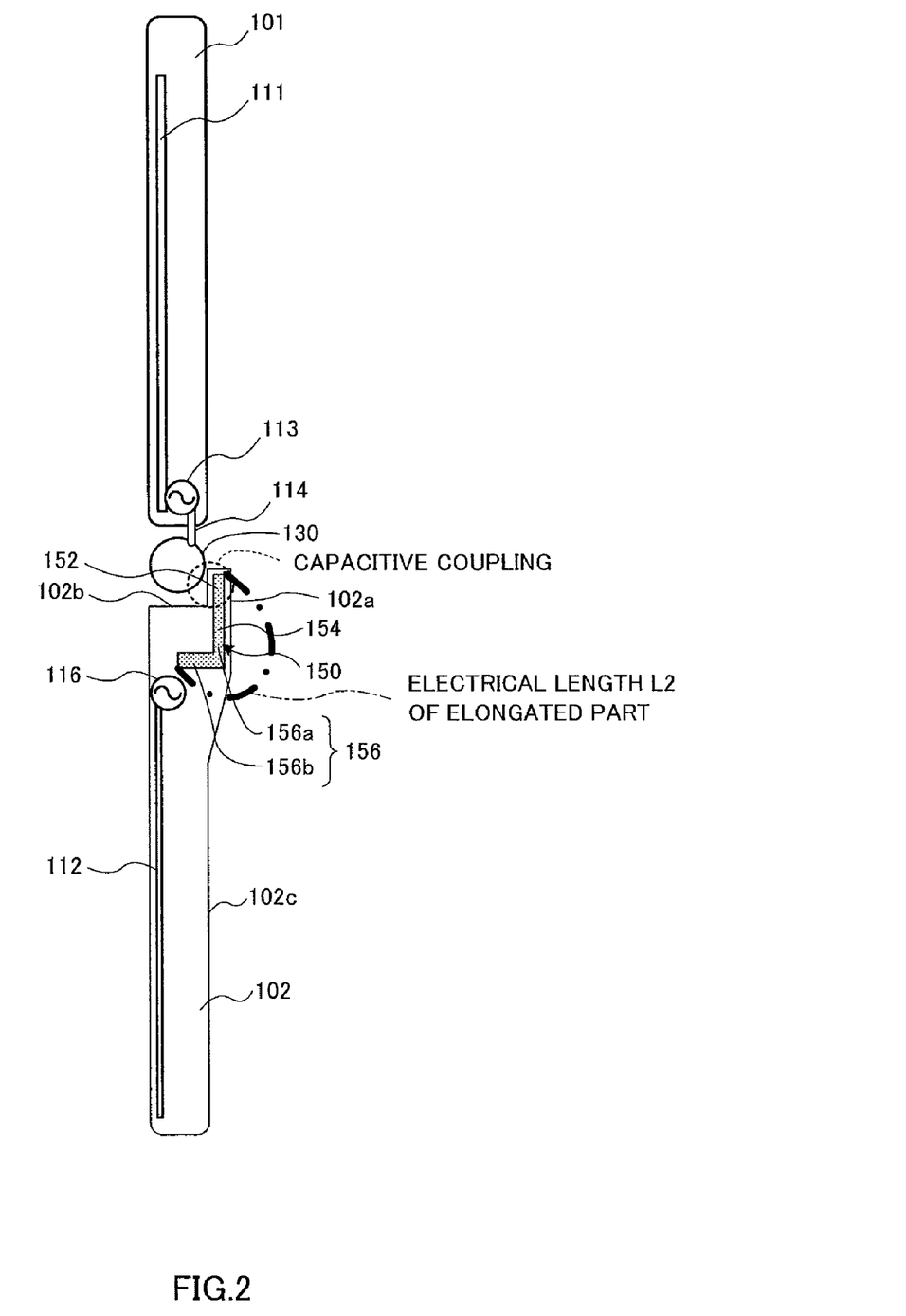
FIG. 2 is a side view showing a schematic configuration of a mobile radio device according to Embodiment 1 of the present invention.

FIG. 1 is a plan view showing a schematic configuration of a flip mobile radio device according to Embodiment 1 of the present invention, and FIG. 2 is a side view showing a schematic configuration of a flip mobile radio device according to Embodiment 1 of the present invention. Note that, with the present embodiment, up, down, left and right mean up, down, left and right when the above flip mobile radio device is seen from a plan view, and the up and down direction is referred to as "vertical direction" and the left and right direction is referred to as "horizontal direction."

With flip mobile radio device 100 (hereinafter "mobile radio device") shown in FIG. 1, first housing 101 (i.e. upper housing) and second housing 102 (i.e. lower housing) are coupled rotatably by the hinge part and rotates about the hinge part to open and close. Note that the hinge part is formed bridging between upper housing 101 and lower housing 102. Although the hinge part is formed between upper housing 101 and lower housing 102 in FIG. 1, only conductive hinge 130 provided coaxially is shown and the outer shape thereof is not shown for ease of explanation. The outer shape of the hinge part will also not be shown in the other embodiments.

Mobile radio device 100 according to the present embodiment has a function of performing wireless communication in one frequency band (here, cellular band of 800 MHz) and a function of performing wireless communication (wireless communication supporting the application band, for example, 500 MHz of the digital television band) in a lower frequency band than that one frequency band.

Flip mobile radio device 100 has: first circuit board 111 and power feeding section 113 provided inside upper housing 101; second circuit board 112 and capacitive coupling element 150 provided inside lower housing 102; and conductive hinge 130 (i.e. hinge core) which is provided in the hinge part and to which power is fed from power feeding section 113. Conductive hinge 130 is short-circuited to second circuit board 112 through cellular antenna 150 (i.e. capacitive coupling element).

With this flip mobile radio device 100, in a state where upper housing 101 is open with respect to lower housing 102, first circuit board 111, second circuit board 112 and conductive hinge 130 to which power is fed from power feeding section 113 operate as a dipole antenna.

Upper housing 101 and lower housing 102 are molded as resin molded goods that are insulating bodies such as non-conductive ABS resin. Housings 101 and 102 each have a rectangular shape, seen from a plan view, such that they are folded to overlap each other by rotating about the hinge part. Here, upper housing 101 is provided with, for example, an LCD display section and a receiver (not shown), and, inside upper housing 101, first circuit board 111 that is an electrically conductive antenna element is provided over virtually the entire surface of the surface area of upper housing 101. Lower housing 102 is provided with an operating part that has operating key buttons and a microphone (not shown), and, inside housing 102, has second circuit substrate 112 on which, for example, a radio section, a control circuit and an information processing circuit are mounted. On the upper end surface of upper end part 102b of this lower housing 102, projecting part 102a is provided on the bottom surface 102c side, and the hinge part that attaches upper housing 101 to this projecting part 102a to be rotatable in the thickness direction of the housing is arranged. Although not shown, upper housing 101 and lower housing 102 are provided with a sub-screen display section, a speaker that outputs ringtones, a camera section that take photographs and a connector part that connects with an external device.

First circuit board 111 provided in upper housing 101 includes an electrically conductive rectangular, planar member that has an outer shape matching the outer periphery of upper housing 101, and, on first circuit board 111, power feeding section 113 that feeds power to conductive hinge 130 is mounted.

In a state (the state shown in FIG. 1 and FIG. 2) where upper housing 101 and lower housing 102 are open, power feeding section 113 is arranged in the right end part (i.e. the lower right corner part) in the lower side part along the lower end part of upper housing 101 coupled to the hinge part.

This power feeding section 113 is provided in the housing (i.e. first housing 101) that faces, across the hinge part, the housing (i.e. second housing 102) provided with cellular antenna 150 and power feeding section 116 that feeds power to cellular antenna 150.

Power feeding section 113 feeds power to the antenna that supports a frequency band lower than a cellular band, and, here, supports an application band (for digital TV and so on). Power feeding section 113 is mounted in a state where power feeding section 113 is short-circuited to first circuit board 111 through short-circuiting part 115, and feeds power to conductive hinge 130 of the hinge part through conductive member 114 that is electrically conductive and that is connected with power feeding section 113.

Conductive member 114 is provided to project toward conductive hinge 130 from power feeding section 113 of upper housing 101, and its projecting end is electrically connected to conductive hinge 130. Here, a metal plate is used for conductive member 114. Note that, although a configuration is employed here where conductive member 114 and conductive hinge 130 are connected by jointing conductive member 114 and conductive hinge 130 physically, the present invention is not limited to this, and a configuration is possible where conductive member 114 and conductive hinge 130 are electrically connected by capacitive coupling.

Conductive hinge 130 may be formed in any way as long as it is an electrically conductive member and couples upper housing 101 and lower housing 102 rotatably. For example, conductive hinge 130 is configured as a hinge axial part that is rotatably inserted through respective parts of upper housing 101 and lower housing 102.

In conductive hinge 130, one end part 130a is arranged on the end part side that is positioned between the lower right corner part of upper housing 101 and the upper right corner part of lower housing 102 in the hinge part that couples upper housing 101 and lower housing 102.

On the other end part 130b side, this conductive hinge 130 is electrically connected by capacitively coupling with part of cellular antenna 150 (i.e. capacitive coupling element) disposed inside lower housing 102.

By contrast with this, second circuit board 112 provided in lower housing 102 is arranged over virtually the entire surface of the surface area of lower housing 102, and has a rectangular shape seen from a plan view. On second circuit board 112, power feeding section 116 that feeds power to cellular antenna 150 as a capacitive coupling element, matching circuit 117, radio section 118 and elongated part adjusting circuit 119 are mounted.

Cellular antenna 150 is fed power from second circuit board 112 through power feeding section 116 that is arranged in the upper right corner of second circuit board 112, and is connected to matching circuit 117 and radio section 118 through power feeding section 116.

Cellular antenna 150 is provided with: capacitive coupling part 152 that is arranged to face part of conductive hinge 130 and that is capacitive-coupled with part of conductive hinge 130 and; elongated part 154 that is connected to the ground pattern of second circuit board 112, in a position apart from capacitive coupling part 152 along the axial direction of conductive hinge 130 and that short-circuits capacitive coupling part 152 and the ground pattern.

Here, inside lower housing 102, cellular antenna 150 is arranged bridging between second circuit board 112 and conductive hinge 130.

Cellular antenna 150 is formed by processing a metal plate and has virtually an inverse L shape seen from a plan view, and long side part 155 is arranged closer to bottom surface 102c than conductive hinge 130, in the upper side part of lower housing 102 and is arranged along upper end part 102b of lower housing 102.

In this long side part 155, capacitive coupling part 152 that faces conductive hinge 130 and that is capacitive-coupled to conductive hinge 130 through the part facing conductive hinge 130, is formed, and short side part 156 is provided to bend downward from one end part of the long side part positioned on the right side of this capacitive coupling part 152.

This short side part 156 is extended downward in lower housing 102, its extended front end is raised in the thickness direction and its front end portion that is raised is connected to power feeding section 116 of second circuit board 112.

This elongated part 154 includes: long side part 155 (i.e. first side part) that is provided to extend from capacitive coupling part 152, in parallel to the axial direction of conductive hinge 130; and short side part 156 (i.e. second side part) that is provided to extend in the direction to part from conductive hinge 130, orthogonally to the front end of first side part 155 and that is connected to the ground pattern through the front end part.

Second circuit board 112 has a rectangular shape, seen from a plan view, that is arranged over the surface area of lower housing 102, and has a ground pattern provided through an insulation layer, in the mounting surface on which cellular power feeding section 113, matching circuit 117, radio section 118 and elongated part adjusting circuit 119 are mounted.

Overall second circuit board 112 functions as a ground plane, functions as the ground of the antenna to which power is fed from power feeding section 116 and functions as an element of the antenna to which power is fed from power feeding section 113.

Cellular power feeding section 116 feeds power to cellular antenna 150 to make cellular antenna 150 operate, and is connected to radio section 118 through matching circuit 117. Further, power feeding section 116 is connected to radio section 118 through matching circuit 117.

Elongated part adjusting circuit 119 is formed with a chip coil and so on, is connected to cellular antenna 150 through power feeding section 116, and short-circuits cellular antenna 150 to second circuit board 112 through short-circuiting part 120 to adjust the length of elongated part 154.

Further, short-circuiting part 120 is formed with a coil and so on, and short-circuits cellular antenna 150 to the ground pattern of second circuit board 112 through elongated part adjusting circuit 119.

Figure 3A:
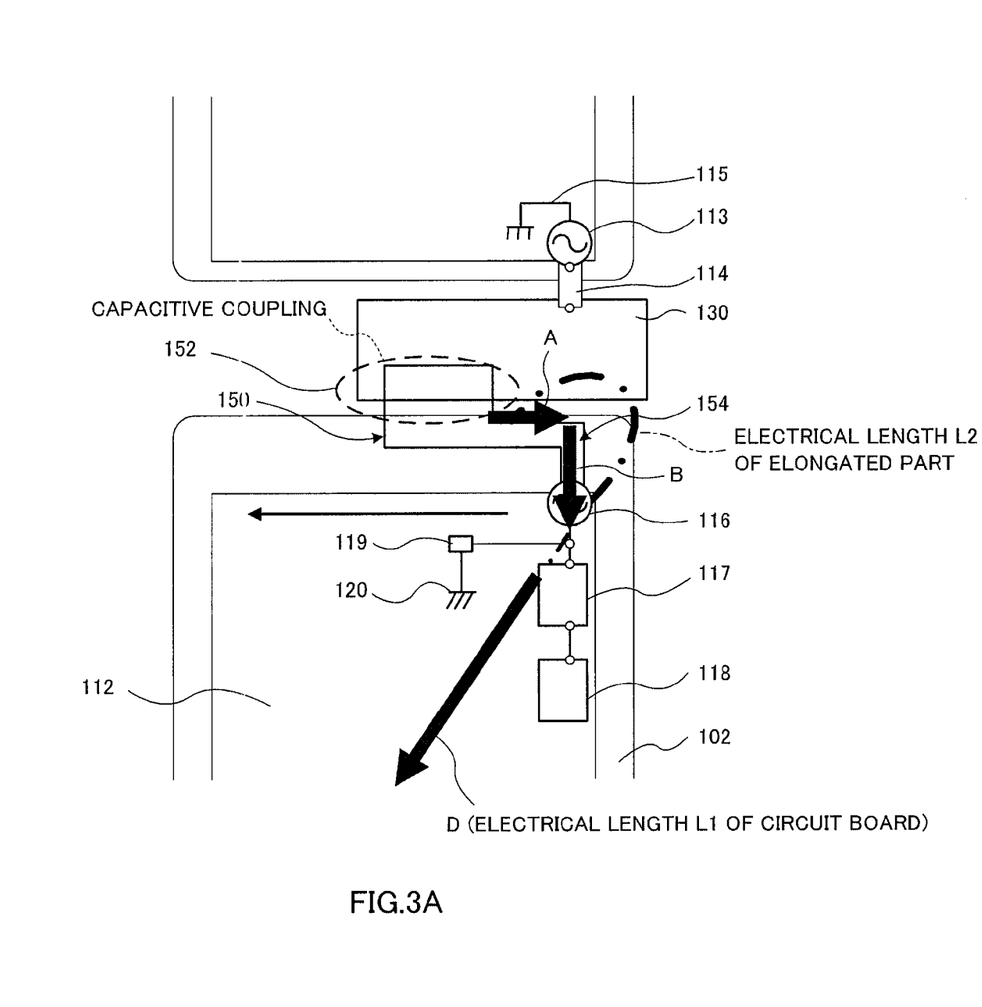
FIG. 3A is a plan view showing a main part configuration of a mobile radio device for illustrating the current of an antenna in a mobile radio device according to the present embodiment.
Figure 3B:
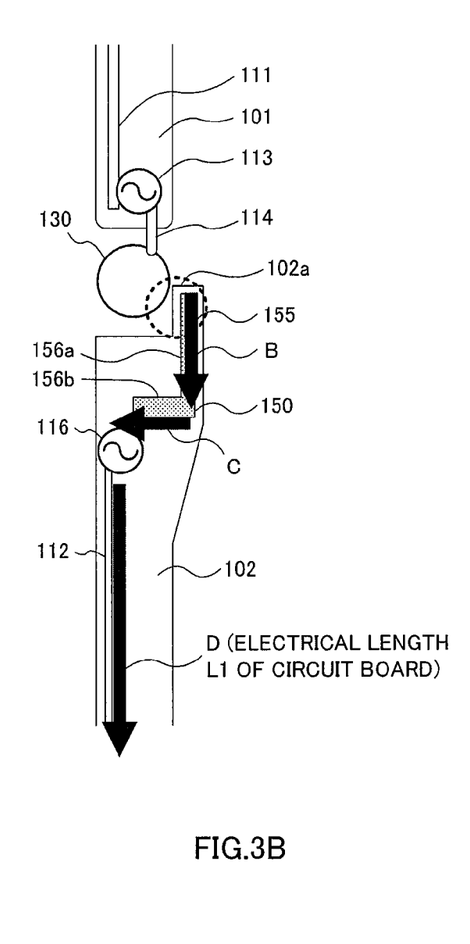
FIG. 3B is a cross-sectional side view showing a main part configuration of a mobile radio device for illustrating the current of an antenna in a mobile radio device according to the present embodiment.

FIG. 3 shows the antenna current in mobile radio device 100 according to the present embodiment, and FIG. 3A is a plan view showing a main part configuration of the mobile radio device for illustrating the antenna current and FIG. 3B is a cross-sectional side view showing a main configuration of the mobile radio device for illustrating the antenna current.

As shown in FIG. 3, cellular antenna 150 in mobile radio device 100 forms an antenna element with conductive hinge 130 and second circuit board 112 around power feeding section 116 (to be more specific, the ground pattern of the second circuit board), in the housing dipole structure that operates to support the application band by feeding power from power feeding section 113 to conductive hinge 130.

Note that resonance of the housing dipole antenna is the sum of circuit board length L1 (also "electrical length of circuit board") and length L2 of elongated part 154 of second circuit board 112.

Elongated part 154 is formed with: long side part 155 (i.e. the first side part, to be more specific, a part projecting to the right from capacitive part 152 in the long side part); and short side part 156.

Further, with mobile radio device 100, capacitive coupling part 152 is arranged apart from conductive hinge 130 in the thickness direction of second housing 102 to face conductive hinge 130 on the bottom surface side of second housing 102, first side part 155 is arranged along conductive hinge 130 on the bottom surface side of second housing 102 and short side part 156 has: horizontal side part 156a that projects from the front end of first side part 155, in a direction to part from conductive hinge 130 horizontally along the bottom; and raised side part 156b that is raised from the front end of horizontal side part 156a and that is connected to the ground pattern through the raised end.

Thus, as shown in FIG. 3, when power is fed from power feeding section 113 to conductive hinge 130 through conductive member 114, the current reaches the corner part of second circuit board 112 after passing through capacitive coupling part 152 of cellular antenna 150, part 155 along conductive hinge 130 in elongated part 154 (arrow A), horizontal side part 156a (arrow B) and raised side part 156b (arrow C).

Then, with the ground pattern of second circuit board 112, the current flows through a route that is positioned farthest from the right corner part (arrow D).

By this means, it is possible to make a mobile radio device smaller and support a low frequency band without extending a metal elongated element from an end part of a circuit board forming the circuit board length or making the dimensions of the circuit board greater in order to make the electrical length longer.

Figure 4:
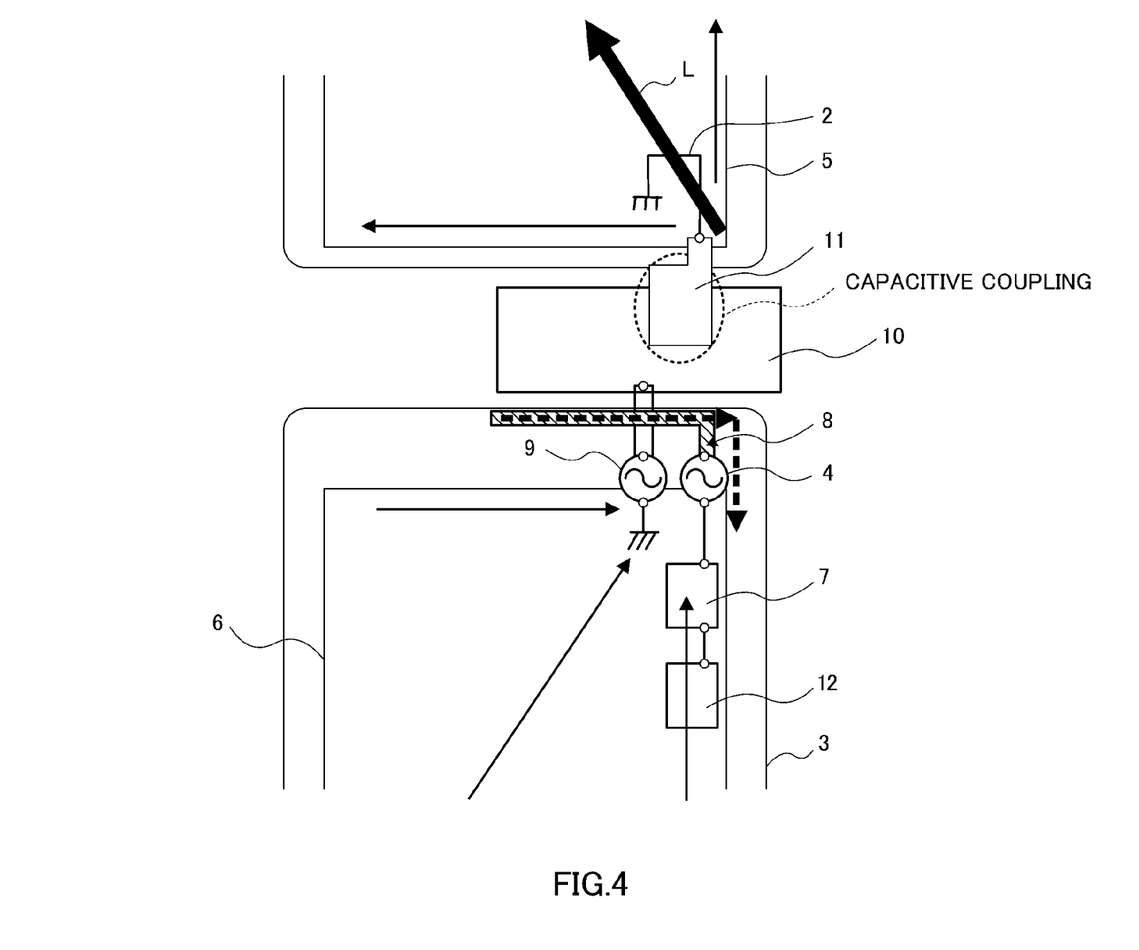
FIG. 4 shows an example of a main part configuration of a mobile radio device that adopts a housing dipole antenna structure for feeding power to a hinge part, which is used in comparison with Embodiment 1, and that can perform various types of wireless communication.

FIG. 4 shows an example of a main configuration of a mobile radio device that adopts a housing dipole antenna structure for feeding power to a hinge part (i.e. conductive hinge) and that performs various types of wireless communication. As shown in FIG. 4, with mobile radio device 1, first housing 2 and second housing 3 are attached rotatably through the hinge part. When power is fed to conductive hinge 10 of the hinge part from power feeding section 9 mounted on second housing 3, antenna element 5 of first housing 2 and circuit board 6 of second housing 3 perform the dipole operation. Conductive hinge 10 is provided in the hinge part, and conductive hinge 10 and first antenna element 5 are conducted by capacitive coupling part 11. Further, radio section 7 and circuit 12 are mounted on circuit board 6 of second housing 3, and therefore power feeding section 9 that feeds power to the hinge part and cellular antenna power feeding section 4 that feeds power to cellular antenna 8 are mounted.

With this configuration, cellular antenna 8 is connected to circuit board 6 that serves as the ground for the application antenna and therefore seems to function as part of the ground. However, with cellular antenna 8, cellular antenna 8 is arranged closer to the hinge in circuit board 6 and the electrical length is shorter than the circuit board length, and therefore this does not matter for the route length. That is, with the conventional configuration, the electrical length for the application antenna is circuit board length L between the part connected with cellular antenna 8 and the farthest position from the part connected with cellular antenna 8. As described above, with the conventional configuration, the ground length of the antenna in case where the housing dipole operation is performed becomes circuit board length L.

Therefore, with the conventional housing dipole antenna structure for feeding power to the hinge core, the housing ground of a limited ground length is used as an antenna element, and therefore the structure sets the lower limit to the frequency to allow resonance and it is difficult to support a lower frequency than, for example, $\lambda/4$ of the housing length.

However, as shown in FIG. 3, with mobile radio device 100, cellular antenna 150 as a capacitive coupling element is arranged near conductive hinge 130, and its one side (i.e. capacitive coupling part 152) is arranged close to the conductive hinge with a predetermined capacitance and the other side (i.e. elongated part 154) is short-circuited to the upper end of the ground pattern of second circuit board 112 inside lower housing 102.

Mobile radio device 100 according to Embodiment 1 is flip mobile radio device 100 in which upper housing 101 and lower housing 102 are coupled rotatably by the hinge part to open and close, and has: first circuit board 111 which is provided inside upper housing 101; second circuit board 112 which is provided inside lower housing 102 and on which radio section 118 is mounted; conductive hinge 130 which is provided in the hinge part; power feeding section 113 which is provided inside upper housing 101 and which feeds power from first circuit board 111 to conductive hinge 130; and cellular antenna 150 (i.e. capacitive coupling element) which is provided inside second housing 102, and which has elongated part 154 that is capacitive-coupled to part of conductive hinge 130 through capacitive coupling part 152 arranged to face part of conductive hinge 130, that is connected to the ground pattern of second circuit board 112, in a position apart from capacitive coupling part 152 along the axial direction of conductive hinge 130 and that short-circuits capacitive coupling part 152 and the ground pattern. Further, the electrical length, which is the sum of the length (the length adding short side part 156 and long side part 155) of elongated part 154 between the part connected to capacitive coupling part 152 and the portion to be connected to the ground pattern and length L between the connected portion and the farthest part from the connected portion in the ground pattern, has a length of virtually $\lambda/4$ wavelength of the frequency band in use.

By this means, in case where the length of cellular antenna 150 (i.e. capacitive coupling element) is L2, the second circuit board length (i.e. effective length for the antenna element) inside lower housing 102 is L1 and (L1+L2) is virtually $\lambda/4$ of the desired frequency, it is possible to secure high antenna performance in a frequency band (here, 500 MHz of the digital television band) lower than a frequency at which the electrical length is $\lambda/4$.

To be more specific, mobile radio device 100 allows the housing dipole antenna that operates when power is fed to conductive hinge 130, to resonate in a frequency band lower than $\lambda/4$ of the electrical length, that is, at 500 MHz, without extending the electrical length (i.e. the housing length and effective length).

Further, cellular antenna 150 is short-circuited to the ground pattern of second substrate 112 through elongated part adjusting circuit 119, it is possible to adjust length L2 (the length of elongated part 154) of cellular antenna 150 even in case where (L1+L2) does not become virtually $\lambda/4$ of the desired frequency. Consequently, even in case where cellular antenna 150 is used as a housing dipole antenna element and a sufficient length of cellular antenna 150 cannot be secured in the space to arrange cellular antenna 150 inside lower housing 102, it is possible to secure high antenna performance in a frequency band lower than a frequency at which the electrical length is $\lambda/4$.

Embodiment 2

Figure 5:
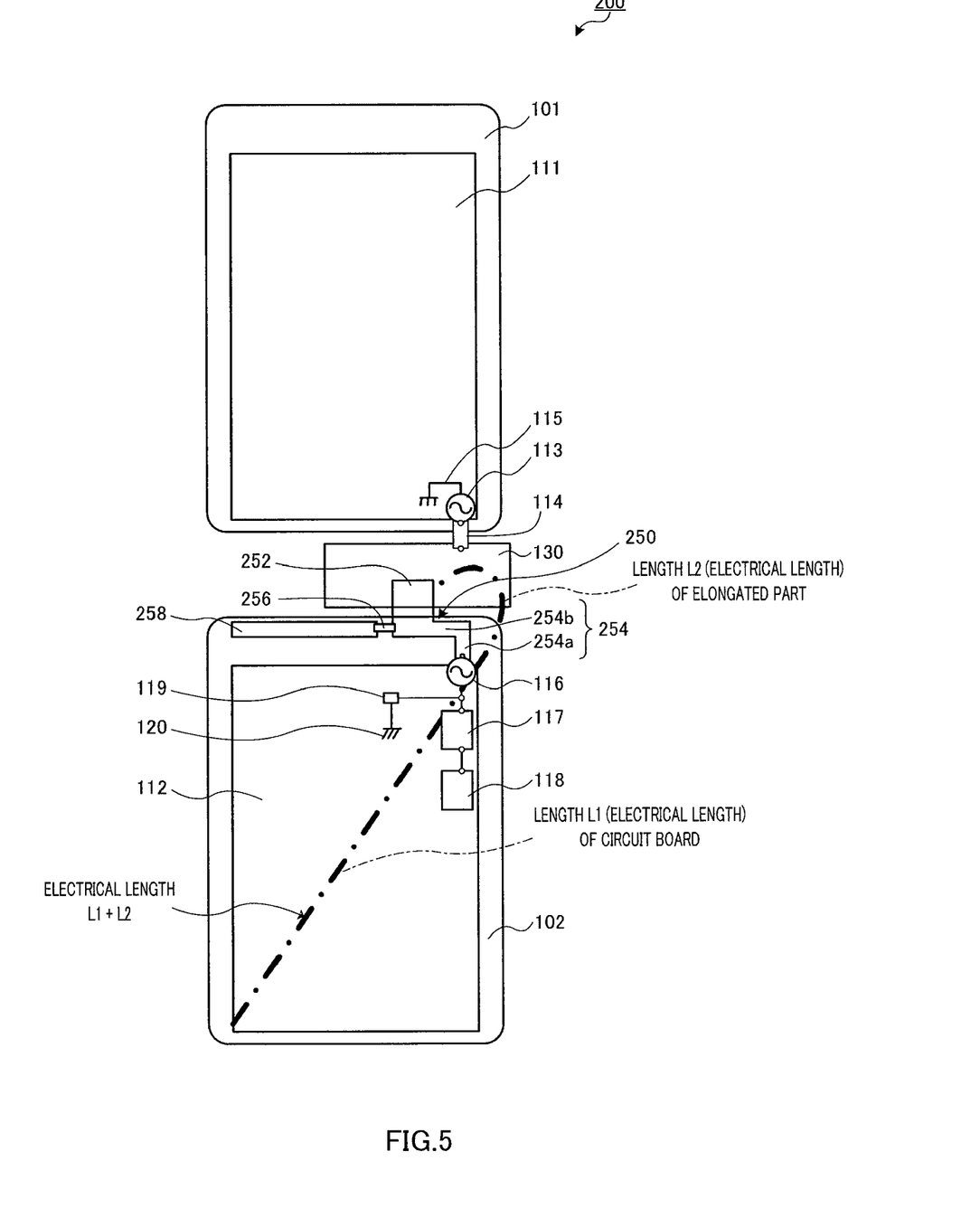
FIG. 5 is a plan view showing a schematic configuration of a mobile radio device according to Embodiment 2 of the present invention.

FIG. 5 is a plan view showing a schematic configuration of a mobile radio device according to Embodiment 2 of the present invention. Note that this mobile radio device 200 differs from corresponding flip mobile radio device 100 according to Embodiment 1 shown in FIG. 1 only in the configuration of cellular antenna 150, and the other configuration thereof is virtually the same. Therefore, the same components will be assigned the same reference numerals and explanation thereof will be omitted below.

Similar to mobile radio device 100, with flip mobile radio device 200 (hereinafter "mobile radio device") shown in FIG. 5, first housing 101 (i.e. upper housing) and second housing 102 are coupled rotatably by the hinge part and rotates about the hinge part to open and close.

Flip mobile radio device 200 has: first circuit board 111 and power feeding section 113 provided inside first housing 101; second circuit board 112 and capacitive coupling element 250 provided inside second housing 102; and conductive hinge 130 which is provided in the hinge part and to which power is fed from power feeding section 113. Conductive hinge 130 is fed power from power feeding section 113 of upper housing 101 through conductive member 114, and is short-circuited to second circuit board 112 through cellular antenna 250 (i.e. capacitive coupling element).

Similar to cellular antenna 150, cellular antenna 250 is capacitive-coupled to part of conductive hinge 130 arranged to face cellular antenna 250, through part of capacitive coupling part 252, is connected to power feeding section 116 in the upper side part of second circuit board 112 and is fed power from power feeding section 116. Note that cellular antenna 250 operates as an antenna element of the dipole antenna for the applicant band which is a frequency band lower than a cellular band supported by first circuit board 111, conductive hinge 130 and the ground pattern.

In the configuration of cellular antenna 150 in mobile radio device 100 formed as virtually an inverse L shape as a whole by processing a metal plate, cellular antenna 250 is configured to provide application band blocking part 256 in the middle of the long side part that is arranged along the upper side part of lower housing 102 and is arranged to face the upper side part of second circuit board 112.

To be more specific, when seen from a plan view, elongated part 254 is formed with: short side part 254a that projects upward (i.e. toward conductive hinge 130) from power feeding section 116 formed in the corner part (i.e. corner part on the right side) of second circuit board 112; and extended part 254b that extends to the left, orthogonally to the end part of the upper side of short side part 254a.

Extended part 254b of this elongated part 254 forms part of the long side part along conductive hinge 130, and capacitive coupling part 252 that extends toward the hinge part and that faces part of conductive hinge 130, in a position that overlaps part of conductive hinge 130 seen from a plan view, continues to the front end part of this extended part 254b. Further, in the direction in which extended part 254b extends (i.e. toward the end part on the left side which is the other end part of conductive hinge 130), strip-like cellular dedicated element 258 is provided beyond application band blocking part 256 to project.

Application band blocking part 256 is formed with, for example, an LC circuit, and blocks a frequency band (i.e. application band) to cause resonance in case where the housing dipole antenna operates when power feeding section 113 feeds power to conductive hinge 130.

Thus, application band blocking part 256 conducts the cellular band to cellular dedicated element 258, so that cellular dedicated element 258 resonates only in the cellular band.

With the present embodiment, application band blocking part 256 is provided in the middle of cellular antenna 250, so that it is possible to provide the same operation and effect as mobile radio device 100 according to Embodiment 1 and arbitrarily change the length of elongated part 254 (to be more specific, the length of extended part 254b of elongated part 254) and the total length of cellular dedicated element 258 (the length along conductive hinge 130 inside lower housing 102) according to antenna performance.

Consequently, with cellular antenna 250, cellular dedicated element 258 can adjust the cellular antenna element length and can be adjusted as an application antenna by adjusting the length of elongated part 254.

For example, it is assumed that cellular antenna 250 is a monopole antenna supporting 2 GHz band, and application band blocking part 256 that is provided bridging between the elongated part and cellular dedicated element 258 at the front end in this cellular antenna 250, is a blocking circuit that becomes open at the frequency band of 2 GHz.

By this means, the housing length of mobile radio device 200 is set to a predetermined length (for example, about 85 millimeters), so that, when it is difficult to arrange cellular antenna 150 as part of the housing dipole antenna element that is resonated in a frequency band lower than a cellular band, it is possible to provide the same advantage as in mobile radio device 100.

Embodiment 3

Figure 6:
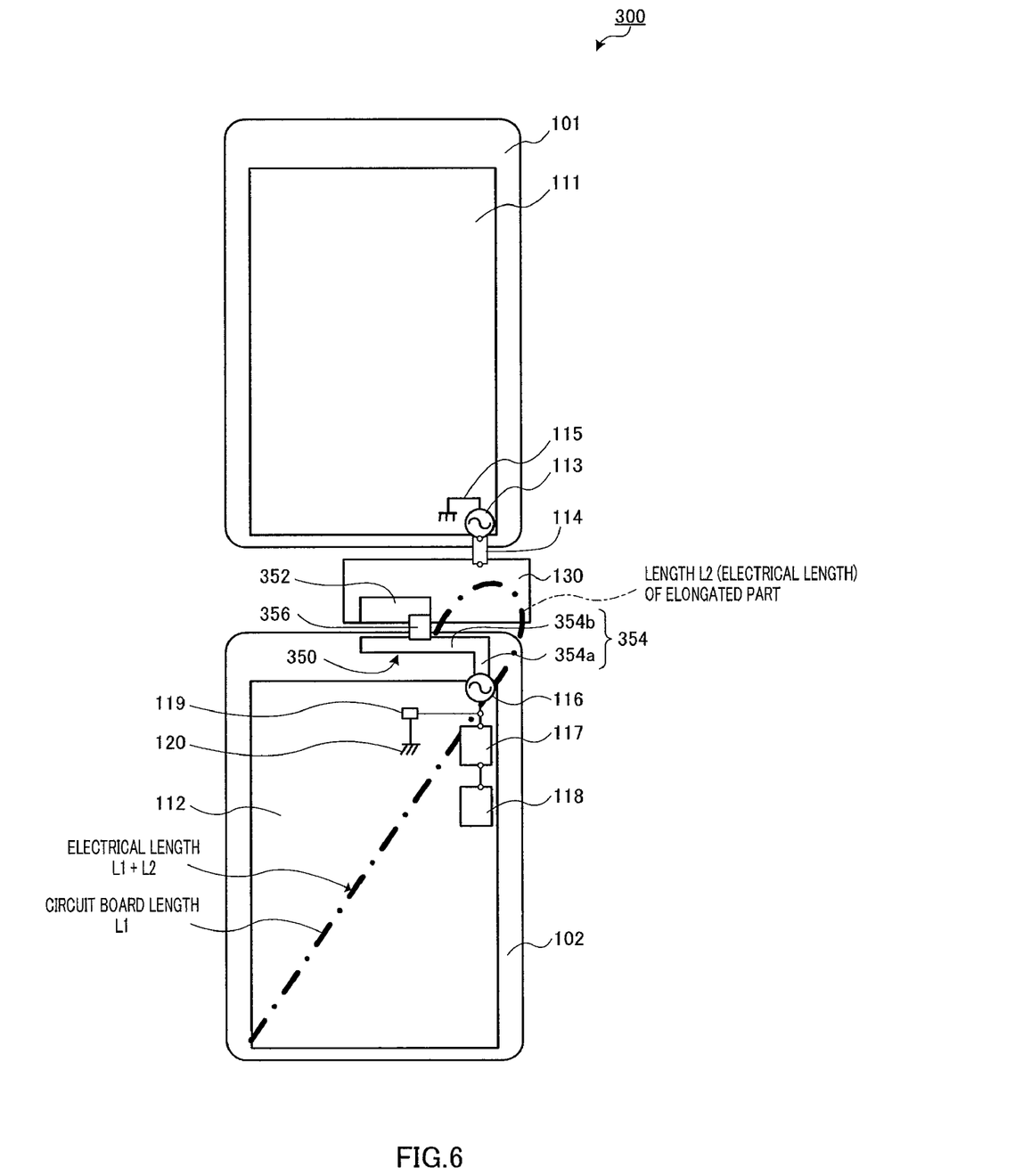
FIG. 6 is a plan view showing a schematic configuration of a mobile radio device according to Embodiment 3 of the present invention.

FIG. 6 is a plan view showing a schematic configuration of a mobile radio device according to Embodiment 3 of the present invention. Note that this mobile radio device 300 differs from corresponding flip mobile radio device 100 according to Embodiment 1 shown in FIG. 1 only in the configuration of cellular antenna 150, and the other configuration thereof is virtually the same. Therefore, the same components will be assigned the same reference numerals and explanation thereof will be omitted below.

Similar to mobile radio device 100, with flip mobile radio device 300 (hereinafter "mobile radio device") shown in FIG. 6, first housing 101 (i.e. upper housing) and second housing 102 are coupled rotatably by a hinge part and rotates about the hinge part to open and close.

Flip mobile radio device 300 has: first circuit board 111 and power feeding section 113 provided inside first housing 101; second circuit board 112 and capacitive coupling element 350 provided inside second housing 102; and conductive hinge 130 which is provided in the hinge part and to which power is fed from power feeding section 113. Conductive hinge 130 is fed power from power feeding section 113 of upper housing 101 through conductive member 114, and is short-circuited to second circuit board 112 through cellular antenna 350 (i.e. capacitive coupling element).

Cellular antenna 350 has the same basic configuration and function as cellular antenna 150, and is capacitive-coupled to part of conductive hinge 130 arranged to face cellular antenna 350, through part of capacitive coupling part 352 and is connected to power feeding section 116 provided in the end part (i.e. corner part on the right side) in the upper side part of second circuit board 112. Cellular antenna 350 operates as a transmitting/receiving antenna for the cellular band when power is fed from power feeding section 116. Further, cellular antenna 350 operates as an antenna element of the dipole antenna for the applicant band in a lower frequency band than the cellular band supported by first circuit board 111, conductive hinge 130 and the ground pattern.

Cellular antenna 350 is formed as virtually an inverse L shape as a whole by processing a metal plate, and is arranged along the upper side part, in the upper side of second circuit board 112 inside lower housing 102 like cellular antenna 150 in mobile radio device 100.

The configuration of cellular antenna 350 of this mobile radio device 300 differs from the configuration of cellular antenna 150 in providing cellular band blocking part 356 between capacitive coupling part 352 and the long side part arranged to face the upper side part of second circuit board 112.

To be more specific, when seen from a plan view, elongated part 354 is formed with: short side part 354a that projects upward (i.e. toward conductive hinge 130) from power feeding section 116 formed in the corner part (i.e. corner part on the right side) of second circuit board 112; and extended part 354b that extends to the left along conductive hinge 130, orthogonally to the end part projecting upward (i.e. toward the conductive hinge) in short side part 354a.

Extended part 354b of this elongated part 354 forms the long side part along conductive hinge 130, and capacitive coupling part 352 that overlaps part of conductive hinge 130 seen from a plan view is provided to continue to the middle of this extended part 354b through cellular band blocking part 356 projecting toward the hinge part.

Capacitive coupling part 352 is arranged in a position to face part of conductive hinge 130, and is capacitive-coupled to part of conductive hinge 130 facing capacitive coupling part 352.

Cellular band blocking part 356 blocks the frequency of the cellular band, is formed with, for example, an LC circuit and secures the distance between elongated part 354 inside lower housing 102 and conductive hinge 130.

That is, with the cellular band, the distance between a cellular antenna and conductive hinge 130 that resonates in the application band (for example, digital television band) is secured, and, with the application band, a cellular antenna and conductive hinge 130 are arranged close.

Thus, when cellular antenna 350 to which power is fed from power feeding section 116 operates, cellular blocking section 356 prevents the current of the frequency (in the application band) to cause resonance in cellular antenna 350, from flowing to conductive hinge 130 through capacitive coupling part 352.

That is, application band blocking part 356 blocks conduction of the cellular band with capacitive coupling part 352, and allows conduction of the application band alone. Accordingly, the antenna that performs the dipole operation by means of conductive hinge 130 to which power is fed from power feeding section 113, first circuit board 111, cellular antenna 350 and second circuit board 112 resonates only in the application band.

By this means, in cellular antenna 350, capacitive coupling part 352 is not connected to the part that functions as cellular antenna 350, so that it is possible to prevent deterioration in cellular antenna 350 performance due to conduction that occurs when capacitive coupling part 352 and conductive hinge 130 are arranged close.

The mobile radio device according to the present invention is not limited to the above embodiments, and can be variously modified and implemented. For example, although first housing 101 is upper housing 101 and second housing 102 is lower housing 102 in mobile radio devices 100, 200 and 300 according to the above embodiments, the present invention is not limited to this, and the first housing may be the lower housing and the second housing may be the upper housing.

The disclosure of Japanese Patent Application No. 2008-004756, filed on Jan. 11, 2008, including the specification, drawings and abstract, is incorporated herein by reference in its entirety.

INDUSTRIAL APPLICABILITY

The mobile radio device according to the present invention is useful as a configuration that adopts an antenna structure for feeding power to a hinge part, that provides an advantage of supporting wireless communication in a low frequency band without making a housing itself larger and that performs various types of wireless communication in mobile radio device devices such as mobile telephones.

The invention claimed is:

1. A flip mobile radio device in which a first housing and a second housing are coupled rotatably by a hinge part to open and close, the flip mobile radio device comprising:
   a first circuit board which is provided inside the first housing;
   a second circuit board which is provided inside the second housing and on which a radio circuit is mounted;
   a conductive hinge which is provided in the hinge part;
   a power feeding section which is provided inside the first housing and which feeds power to the conductive hinge from the first circuit board; and
   a capacitive coupling element which is provided inside the second housing, and which comprises an elongated part that is capacitive-coupled to a part of the conductive hinge, through a capacitive coupling part arranged to face the part of the conductive hinge, that is connected to a ground pattern of the second circuit board, in a position apart from the capacitive coupling part along an axial direction of the conductive hinge and that short-circuits the capacitive coupling part and the ground pattern.

2. The flip mobile radio device according to claim 1, wherein an electrical length comprises a length which is virtually $\lambda/4$ wavelength of a frequency band in use, the electrical length comprising the sum of a length of the elongated part between a part connected to the capacitive coupling part and a portion connected to the ground pattern, and a length between the portion connected to the ground pattern and a farthest part from the portion connected to the ground pattern.

3. The flip mobile radio device according to claim 1, wherein the elongated part comprises:
   a first side part which is provided to extend from the capacitive coupling part in parallel to the axial direction of the conductive hinge; and
   a second side part which is provided to extend in a direction away from the conductive hinge, orthogonally to a front end of the first side part, and which is connected to the ground pattern through a front end part.

4. The flip mobile radio device according to claim 3, wherein:
   the capacitive coupling part is arranged apart from the conductive hinge in a thickness direction of the second housing and arranged to face the conductive hinge on a bottom surface side of the second housing;
   the first side part is arranged along the conductive hinge on the bottom surface side of the second housing; and
   the second side part comprises:
      a horizontal side part which projects from the front end of the first side part, in a direction away from the conductive hinge and horizontally along a bottom surface of the second housing; and
      a raised side part which is raised from a front end of the horizontal side part and which is connected to the ground pattern through a raised end part.

5. The flip mobile radio device according to claim 1 further comprising an elongated part adjusting circuit which is mounted on the second circuit board, which is connected to an end part of the elongated part, and which short-circuits the capacitive coupling element comprising the elongated part with the ground pattern of the second circuit board.

6. The flip mobile radio device according to claim 1, wherein:
   the capacitive coupling element is used as a cellular antenna; and
   the first circuit board, the conductive hinge and the ground pattern are configured to operate as a dipole antenna supporting an application band which is a lower frequency band than a cellular band.

7. The flip mobile radio device according to claim 6, wherein the capacitive coupling element comprises:

a cellular dedicated element which extends from a connection portion that connects the capacitive coupling part and the elongated part, and extends away from the elongated part; and an application blocking section configured to provide bridging between the cellular dedicated element and the connection portion and to block the application band.

8. The flip mobile radio device according to claim 1, wherein the capacitive coupling part is connected to the elongated part through a cellular blocking section that is configured to block a frequency of a cellular band.

9. The flip mobile radio device according to claim 1 further comprising a second power feeding section which is provided inside the second housing and which feeds power to the capacitive coupling element from the second circuit board.

10. The flip mobile radio device according to claim 9, wherein the radio circuit is connected to the second power feeding section.

* * * * *